United States Patent

[11] 3,620,479

[72] Inventor Hiroyuki Umeda
Yokohama, Japan
[21] Appl. No. 44,708
[22] Filed June 9, 1970
[45] Patented Nov. 16, 1971
[73] Assignee Victor Company of Japan, Ltd.
Yokohama City, Kanagawa-ken, Japan
[32] Priorities June 10, 1969
[33] Japan
[31] 44/45018;
July 10, 1969, Japan, No. 44/54070

[54] TAPE CARTRIDGE LOADING DEVICE
9 Claims, 6 Drawing Figs.

[52] U.S. Cl. .......... 242/198, 274/4 C
[51] Int. Cl. .......... G03b 1/04, G11b 15/32, G11b 23/04
[50] Field of Search .......... 242/197–200, 55.19 A; 274/4 C–4 F, 11 C, 11 D

[56] References Cited

UNITED STATES PATENTS

| | | | |
|---|---|---|---|
| 2,661,162 | 12/1953 | Owens | 242/200 |
| 3,385,534 | 5/1968 | Staar | 242/200 X |
| 3,494,572 | 2/1970 | Vemura | 242/198 |
| 3,540,738 | 11/1970 | Yamamoto | 274/4 |

*Primary Examiner*—Leonard D. Christian
*Attorney*—Louis Bernat

ABSTRACT: A tape cartridge loading device for loading and removing a tape cartridge in and from a chassis of a cartridge type recording and reproducing apparatus. Upon complete insertion of the cartridge into the chassis, a reel shaft is moved upwardly and fits into the cartridge. Upon withdrawal of the reel shaft from the cartridge, the cartridge is released from a locked position where it is ready for removal from the chassis.

INVENTOR
HIROYUKI UMEDA
BY [signature]
ATTORNEY

INVENTOR

HIROYUKI UMEDA

BY [signature]

ATTORNEY

INVENTOR
HIROYUKI UMEDA
BY [signature]
ATTORNEY

INVENTOR
HIROYUKI UMEDA
BY [signature]
ATTORNEY

INVENTOR
HIROYUKI UMEDA
BY [signature]
ATTORNEY

INVENTOR

HIROYUKI UMEDA

BY [signature]

ATTORNEY

TAPE CARTRIDGE LOADING DEVICE

The present invention relates to a tape cartridge loading device, and more particularly to a device for smoothly loading and removing a tape cartridge into and from a cartridge type recording and reproducing apparatus.

The invention relates to an apparatus generally using a tape cartridge containing a built-in reel having a tape wound thereon. When the cartridge is loaded at a predetermined position in a cartridge loading device, a reel disc and a reel shaft are actuated in cooperation with the loading operation of the cartridge, to enter into the cartridge and engages the reel mounted in the cartridge. In prior art tape cartridge loading devices, a reel shaft gradually moves upwardly as a cartridge is inserted into a chassis. Accordingly, in the prior art devices the upper end of the reel shaft often abuts against the lower surface of the cartridge. This tends to obstruct a smooth insertion of the cartridge and causes damage to the upper end of the reel shaft.

Further, in the conventional tape cartridge loading devices, the releasing of the cartridge from its locked position and withdrawing of the reel shaft are effected substantially simultaneously. At the same time, the cartridge is automatically pushed outwardly by some distance to facilitate removal thereof from the apparatus. Accordingly, the cartridge receives a pushing force acting in the direction of cartridge removal simultaneously with the releasing thereof from its locked position. At this time, the reel shaft still remains engaged in the reel of the cartridge. As a result, a smooth withdrawal of the reel shaft from the cartridge and a smooth removal of the cartridge from the chassis are obstructed. Also, the reel in the cartridge and the reel shaft tend to be damaged.

According to the present invention, the insertion of the tape cartridge is effected so that the reel shaft and the reel disc are automatically moved upwardly only when the cartridge is completely inserted and loaded. Accordingly, the insertion of the cartridge is not obstructed by the reel shaft. When removing the tape cartridge, the cartridge is released from its locked position with a proper time delay after the reel shaft is withdrawn from the cartridge, whereby the cartridge may be smoothly removed without damaging the reel shaft or the reel.

Accordingly, a general object of the present invention is to provide a novel and useful tape cartridge loading device which eliminates the above-mentioned disadvantages of the prior art devices.

Another object of the invention is to provide a device in which a reel shaft does not abut against a tape cartridge on inserting the cartridge into the device, thereby to effect a smooth loading of the cartridge without damaging the reel shaft.

Another object of the invention is to provide a device in which a tape cartridge is pushed out in removing it from the device after a reel shaft is withdrawn from the cartridge thereby to effect a smooth removal of the cartridge without damaging the reel shaft and the reel.

Still another object of the invention is to provide a device having a relatively simple mechanical construction for effecting a smooth loading and a smooth automatic removal of a tape cartridge.

Additional objects and features of the invention will become more apparent from a consideration of the following description when taken in conjunction with the accompanying drawings, in which FIG. 1 is a perspective view of one embodiment of an automatic tape loading type recording and reproducing apparatus in which the device according to this invention can be applied;

Figure 1:
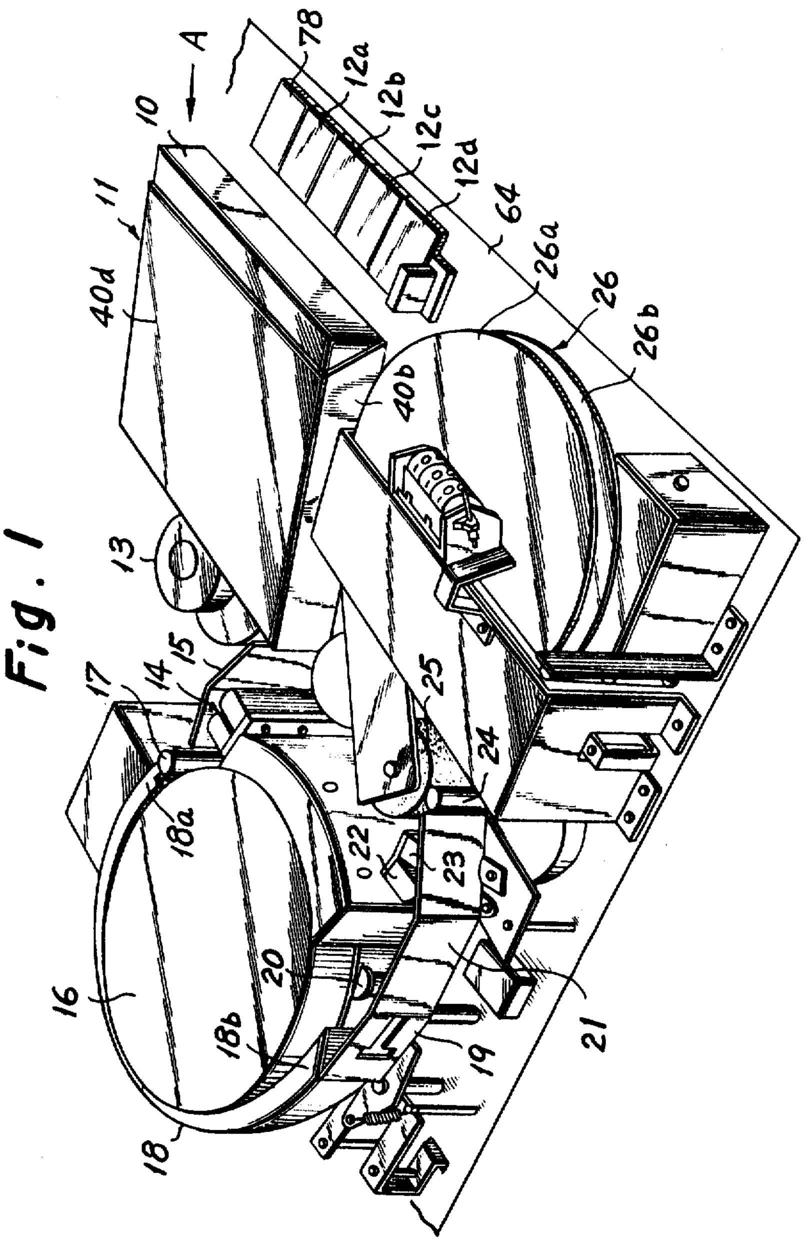

One embodiment of a cartridge type automatic tape loading magnetic recording and reproducing apparatus incorporating this invention will now be explained with reference to FIG. 1. In the apparatus, a tape provided in the tape cartridge is automatically loaded at a predetermined path of travel in the apparatus, and a video signal is recorded on and reproduced from the tape. This apparatus is generally called a video cartridge recorder (VCR).

A tape cartridge 10 having a built-in reel is inserted into the cartridge loading chassis 11 of the magnetic recording and reproducing apparatus. The cartridge is pushed in the direction of arrow A. The chassis 11 is inclined forwardly with respect to a chassis base 64. Under the chassis 11 is provided the device of this invention, the operation of which will be described hereinbelow with reference to FIGS. 2, 3, 4, 5, and 6. After the cartridge 10 is completely loaded in the chassis 11, a recording and reproducing button **12*a* is pushed. As the button 12*a* is pushed, a delivery roller 13 is given a rotational force, and it begins to rotate. At the same time, the roller 13 enters into the tape cartridge 10 through an opening (not shown) in the front end of the cartridge and is brought into contact with an outer periphery of a winding of tape wound on the reel in the cartridge 10**. The outer winding of the tape consists of a magnetic tape and a relatively hard, but flexible, tape leader connected to the leading end of the magnetic tape.

As the roller 13 rotates while it is in engagement with the winding of tape, the tape leader is delivered out of a delivery opening (not shown) of the cartridge and moved in a substantially straight direction. The tape leader is passed between a fixed erasing magnetic head assembly 14 and a guide plate 15, then between a cylindrical guide drum 16 and a guide pole 17, and is moved into an entrance **18*a* of a tape leader guide 18. The guide drum 16 consists of an upper drum portion and a lower drum portion, and it has built-in rotary magnetic heads which are rotatable within a space interposed between the upper and lower portions of the drum. The leader guide 18 is mounted along substantially half the circumference of the guide drum 16 and is spaced apart therefrom by a small distance. The guide 18 is positioned obliquely with respect to the above-mentioned space between the upper and lower drum portions. The guide 18 has a C-shaped cross section with its opening facing the guide drum 16**.

The leader which has moved into the entrance **18*a* is guided through the guide 18 to an exit 18*b* where it leaves the guide. Then the tape leader passes between a guide plate 19 and a guide pole 20, and between a guide plate 21 and a magnetic head assembly consisting of an audio signal magnetic head 22 and a control signal magnetic head 23. The leader further passes between a capstan 24 and a pinch roller 25 and moves into a space between an upper flange 26*a* and a lower flange 26*b* of a rotating automatic takeup reel 26. The takeup reel 26 has pivotal pawls which are mounted on a hub of the reel in such a manner that they can emerge from and submerge in the hub. When they emerge, these pawls catch the tape leader as the reel rotates. Thus the tape is taken up and wound on the takeup reel 26**. This completes the operation of the automatic loading of the tape in the apparatus.

As the leader is caught by the takeup reel 26, the roller 13 is moved away from the cartridge 10, and the pinch roller 25 contacts the capstan 24 thereby positively driving the tape leader and the tape. A first leader portion forms the foremost end of the tape leader and has a width which is equal to the width of the tape. This portion is the first to pass through the leader guide 18. A second tape leader portion follows the first leader portion and has a width which is smaller than the width of the tape. As the second leader portion reaches the guide 18, following the movement of the first leader portion, the second leader portion is led out of the opening of the guide 18. The magnetic tape following the second leader portion travels along a path which comes into engagement with the guide drum 16. The rotary magnetic heads mounted on the guide drum 16 record video signals on and reproduce them from the tape moved by the capstan 24 and the pinch roller 25. Video signal tracks are disposed obliquely with respect to the longitudinal axis of the tape.

Figure 2:
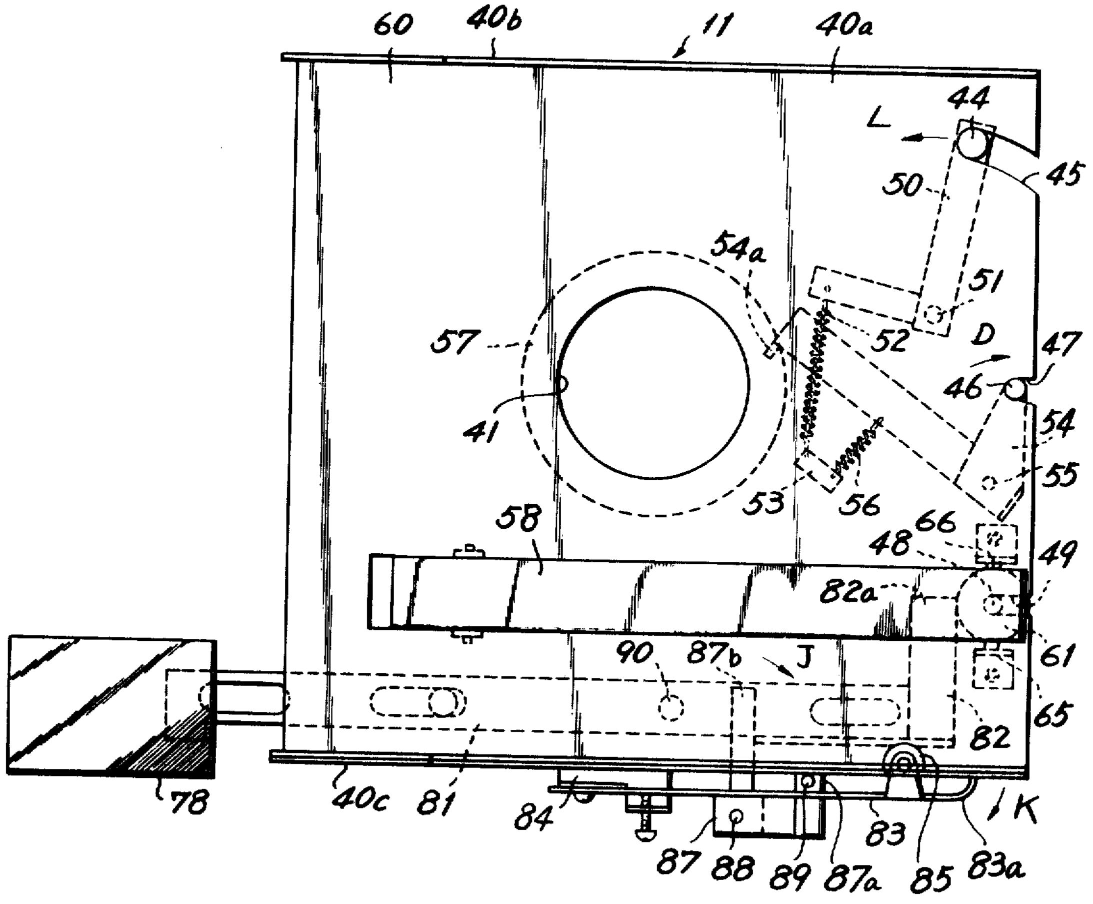
FIG. 2 is a plan view of one embodiment of the device according to the invention.
Figure 3:
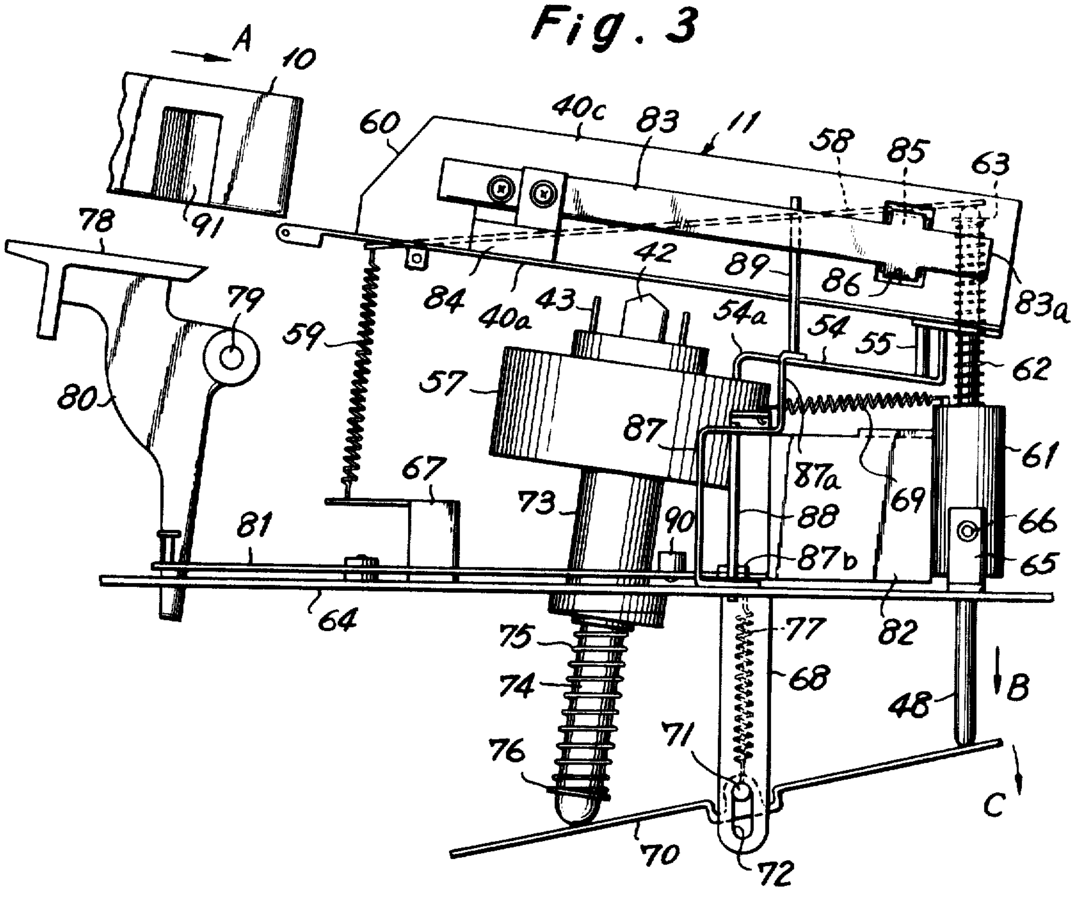
FIG. 3 is a side view of the device before a tape cartridge is inserted.

FIGS. 2 and 3 respectively show a plan view and a side view of the cartridge loading chassis 11. In these figures, the chassis 11 includes a bottom plate 40*a*, side plates 40*b* and 40*c* and a top plate 40*d* (FIG. 1). As mentioned hereinabove, the chassis 11 is inclined with respect to the chassis base 64 as shown in FIG. 3. The mechanism for securing the chassis 11 is omitted from the drawing. On the bottom plate 40*a* are formed an opening 41 for receiving a reel shaft 42 and fixing pins 43, a recess 45 for receiving a push out pin 44, a recess 47 for receiving a cartridge loading detection pin 46, and a recess 49 for receiving a sliding rod 48. A rotating arm 50, mounting the pin 44 on one end thereof, is pivotally mounted on an arbor 51. A spring 52 is provided between the other end of the rotating arm 50 and a fixed member 53. The spring 52 applies a counterclockwise rotating force to the arm 50, i.e., in the direction of arrow L. The arm 50 is thus normally urged by the spring 52 so that the pin 44 is engaged in the innermost part of the recess 45, as shown in FIG. 2.

A rotating arm 54, mounting a pin 46 at the end of one arm portion thereof, is pivotally mounted on an arbor 55. A spring 56 is provided between the other arm portion of the arm 54 and the fixed member 53. The spring 56 applies counterclockwise a rotating force to the arm 54. The arm 54 is thus normally urged by the spring 56, and the pin 46 is engaged in the innermost part of the recess 47 as shown in FIG. 2. A bent end portion 54*a* formed at the end of the other arm portion of the arm 54 engages an upper surface of a reel disk 57. The reel disk 57 mounts the reel shaft 42 and the pins 43 on the upper surface thereof.

An actuating plate 58 is pivotally mounted in the vicinity of a cartridge insertion opening 60. The mounting is on the bottom plate 40*a* of the chassis 11 so that plate 58 can be moved in a pivotal motion on the bottom plate 40*a*. A spring 59 is connected between one end of the actuating plate 58 and a projection 67 provided on the chassis base 64. The actuating plate 58 is normally pulled by the spring 59, to impart a rotating motion at the free end of the actuating plate which swings upwardly from the bottom plate 40*a* within the chassis 11 as shown in FIG. 3.

At this stage, the free end of the actuating plate 58 is supported on the upper end of the sliding rod 48. The sliding rod 48 is vertically slidably supported by a bearing 61. Fitted on the sliding rod 48 is a spring 62 which is disposed between the upper end of the bearing 61 and an engaging ring 63 fixed at the upper end of the sliding rod 48. The sliding rod 48 is urged upwardly by a resilient force of the spring 62. The bearing 61 is pivotally supported on an arbor 66 of a holder 65 secured on the chassis base 64. A spring 69 is provided between the upper end of the bearing 61 and the upper end of a fixed plate 68 mounted on and penetrating through the chassis base 64. Urged by the tension of the spring 69, the bearing 61 is normally held in a vertical position as shown in FIG. 3.

A rotating plate 70 has a pivot pin 71 which is pivotally and vertically slidably engaged in a slot 72 provided at the lower end of the fixed plate 68. A sliding shaft 74 which fixedly mounts the reel disc 57 at the upper end thereof is slidably supported in a vertical bearing 73. Fitted on the sliding shaft 74 is a spring 75 which extends between the lower end of the bearing 73 and an engaging ring 76 fixed at the lower end of the sliding shaft 74. The sliding shaft 74 is urged downwardly by a resilient force of the spring 75. Since the chassis 11 is inclined with respect to the chassis base 64, the bearing 73 is fixed obliquely with respect to the chassis base 64. Thus, the sliding shaft 74 can slide vertically with respect to the bottom plate 40*a* of the chassis 11.

A spring 77 extends between the chassis base 64 and the arbor or pivot pin 71 of the rotating plate 70. The rotating plate 70 is urged upwardly by the tension of the spring 77. Accordingly, the rotating plate 70 is normally disposed in the position shown in FIG. 3, being engaged at either end thereof by the lower ends of the sliding rod 48 and the sliding shaft 74.

A tape cartridge removal button 78 is provided on the upper end of a rotating lever 80 which moves in a pivotal motion about an arbor 79. A sliding lever 81 is mounted on the chassis base 64 and is moved in a sliding motion over the base 64 by a pivotal movement of the lever 80. At one end of the sliding lever 81 is an actuating plate 82 having an engaging portion 82*a* which engages the bearing 61.

A leaf spring 83 is secured at one end thereof on the outer surface of the side plate 40*c* by means of a fixing plate 84. A bent end 83*a* of the leaf spring 83 engages the surface of the side plate 40*c*. A roller 85 mounted on the leaf spring 83 is received within the chassis 11 through an opening 86 formed in the side plate 40*c*. A lever 87 pivots about an arbor 88. On a lever portion 87*a*, at one end of the lever 87, is mounted a pin 89 which is disposed between the side plate 40*c* and the leaf spring 83. As the sliding lever 81 moves in a sliding motion, a pin 90 mounted thereon pushed a lever portion 87*b* at the other end of the lever 87, and the lever 87 is moved in a pivotal motion. The pin 90 is upstanding on the lever 81 and spaced away from the lever portion 87*b* by a distance which enables the pin 90 to push the lever portion 87*b* after the actuating plate 82 has pushed the bearing 61. It tilts as the sliding lever 81 slides to the right, as will be described more in detail hereinbelow.

Figure 4:
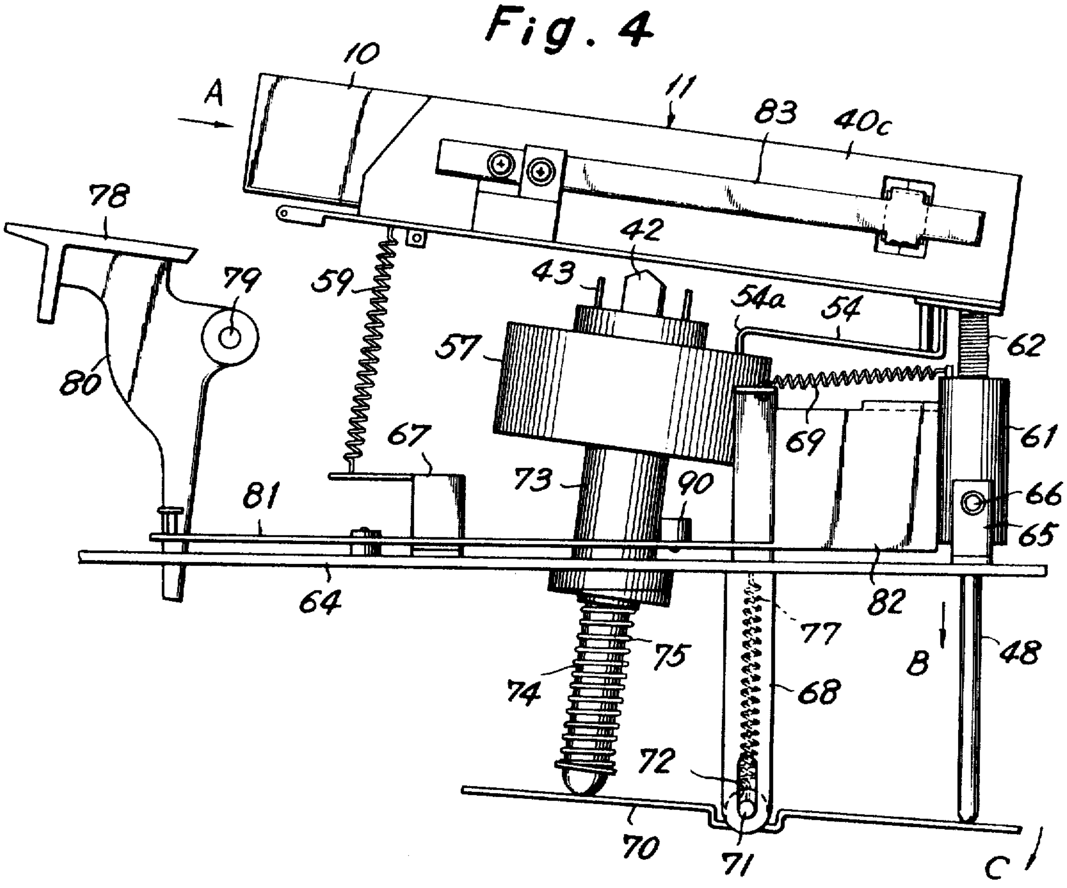
FIG. 4 is a side view of the same device before loading of the cartridge is completed.
Figure 5:
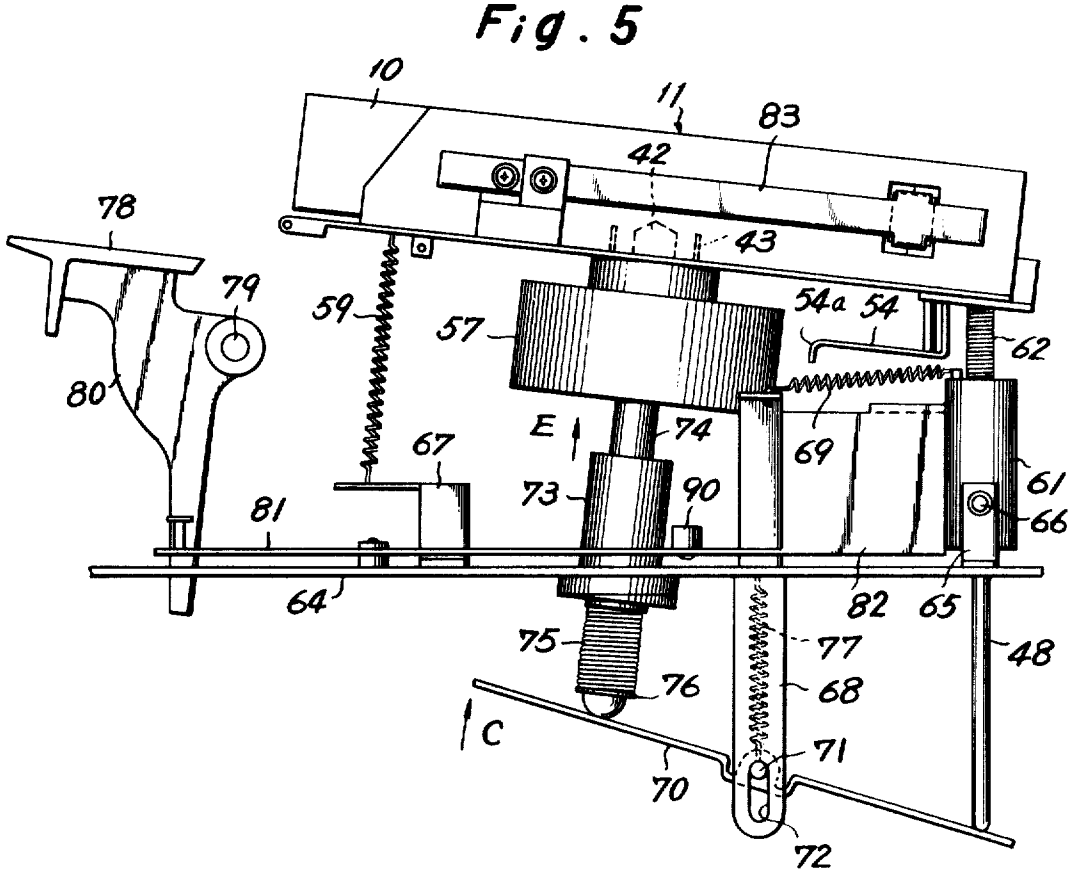
FIG. 5 is a side view of the same device after loading of the cartridge is completed.

Now the operation of the device according to the invention will be described with reference to FIGS. 2, 3, 4, 5, and 6. In FIGS. 4 and 5 the lever 87 and the pin 89 are omitted.

First, the operation of the device during the loading the tape cartridge 10 will be described. The tape cartridge 10 is inserted into the chassis 11 through the opening 60 in the direction of arrow A shown in FIG. 3. As the cartridge 10 is inserted into the chassis 11, the actuating plate 58 is pushed by the cartridge 10, and it moves in a pivotal motion in the clockwise direction in FIG. 3. The downward pivotal movement of the actuating plate 58 pushes the upper end of the sliding rod 48, and the rod 48 slides axially (in the direction of the arrow B) against the force of the spring 62.

As the sliding rod 48 moves downwardly in the direction of arrow B, the rotating plate 70 is rotated in the direction of arrow C. Its right-hand end is pushed by the lower end of the sliding rod 48. The other end of plate 70 engages the lower end of the sliding shaft 74. Simultaneously with the rotating movement of the rotating plate 70, the pivot pin or arbor 71 moves downwardly against the force of the spring 77 and along the slot 72. The left end of the rotating plate 70 applies an axial force to the sliding shaft 74 which force acts in the upward direction, but the sliding shaft 74 does not move upwardly because the reel disc 57 is engaged by the bent end portion 54*a* of the arm 54.

Just before the completion of the loading of the cartridge 10 in the chassis 11, the sliding rod 48 is disposed at the position shown in FIG. 4. As the cartridge 10 is slid into the chassis 11, the forward end of the cartridge 10 causes the pin 44, projecting through the notch 45 on the bottom plate 40*a*, to move in a pivotal motion against the force of the spring 52. According, a force for swinging the arm carrying the pin 44 is stored in the spring 52.

The cartridge 10 is further inserted the last short distance into the chassis 11 as shown in FIG. 5. The forward end of the cartridge 10 pushes the pin 46 (FIG. 2) projecting through the recess 47 formed on the bottom plate 40*a*. The pin moves against the force of the spring 56. As the pin 44 is pushed, the arm 54 moves in a pivotal motion in the direction of arrow D and against the force of the spring 56. The bent end portion 54*a* is disengaged from the upper surface of the reel disc 57, thereby releasing the reel disc 57, from engagement with the bent end portion 54*a*.

The springs 77 and 75 are constructed so that the resilient force of the spring 77 is greater than that of the spring 75. Accordingly, when the reel disc 57 is released from engagement with the bent end portion 54*a*, the sliding shaft 74 is pushed responsive to the force of the rotating plate 70. The force exerted by the spring 77 moves shaft 74 upwardly, in a sliding motion, in the direction of arrow E in FIG. 5 and against the force of the spring 75. The rotating plate 70 further rotates in the direction of arrow C. Simultaneously, the rotating plate 70 moves upwardly responsive to the tension of the spring 77. The pivot pin or arbor 71 is led along the slot 72.

As the sliding shaft 74 moves upwardly, the reel shaft 42 and the fixing pins 43 mounted on the reel disc 57 enters into the cartridge 10. This entry is through the opening 41 formed on the bottom plate 40*a* and an opening (not shown) formed on the bottom of the cartridge. The reel shaft 42 and the fixing pins 43, having entered into the cartridge 10, are respectively fitted into a reel hole and holes for receiving the fixing pins (not shown) of the built-in reel provided in the cartridge 10. Thus, the reel and the reel disc can be rotated as a unit.

At this stage, the loading operation of the cartridge 10 is completed. The tape and the tape leader wound on the reel inside the cartridge can be delivered out of the reel. When the cartridge 10 is completely inserted in the chassis 11, the roller 85 is brought into engagement with a recess 91 (shown in FIG. 3) provided on the side surface of the cartridge 10. Roller 85 is held by the resilient force of the leaf spring 83. The roller 85 holds the cartridge 10 in its loaded position.

The reel shaft 42 and the fixing pins 43 do not enter into the cartridge 10 as described hereinabove, until after the loading of the cartridge 10 is completed by a complete insertion thereof into the chassis 11. This prevents damage to the reel shaft 42 and the fixing pins 43 and ensures a smooth insertion of the cartridge 10 into the chassis 11.

In recording and reproducing operations, the recording and reproducing button 12*a* is pushed, as described hereinabove, to deliver the tape leader and the tape. In a rewinding operation, the rewinding button 12*d* is pushed to actuate a rewinding roller (not shown) which, upon being actuated, bears against the reel disc 57. This roller causes the reel to rotate in a direction which is reverse to the direction in which it rotates when the tape is delivered out of the reel. This reverse rotation rewinds the tape and the tape leader into the cartridge 10.

Figure 6:
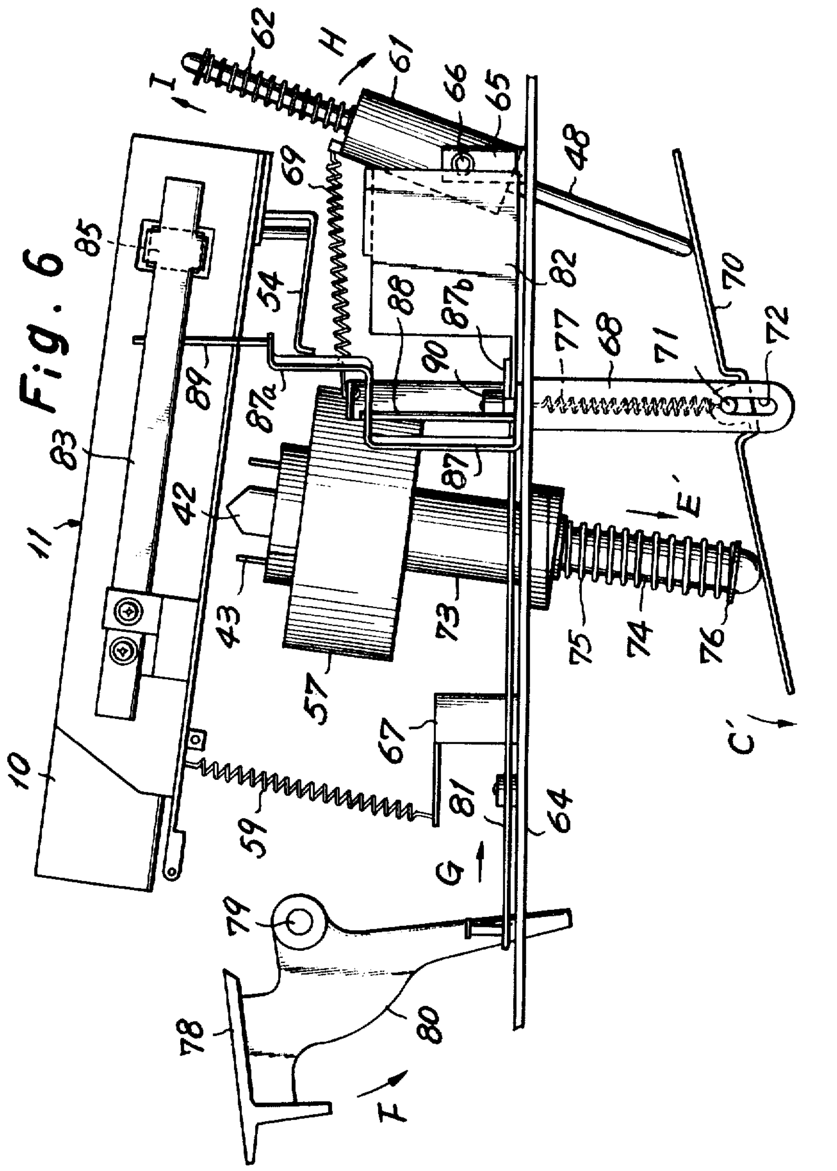
FIG. 6 is a side view of the same device when the cartridge is removed.

The removal of the cartridge 10 previously loaded in the chassis 11 will be described next. Before removing the cartridge 10 from the chassis 11, the tape and the tape leader must be rewound on the reel of the cartridge 10. In FIG. 6 the tape cartridge removal button 78 is pushed. The rotating lever 80 rotates in the direction of arrow F and moves the sliding lever 81 in a sliding motion in the direction of arrow G. The actuating plate 82 also moves in the direction of arrow G. It is desirable to provide a mechanism in this apparatus for locking the rotating lever 80 so that the push button 78 will not operate unless the tape and tape leader have been completely rewound on the reel of the cartridge 10.

As the actuating plate 82 moves, the engaging portion 82*a* thereof pushes the side of the bearing 61. The bearing 61 rotates about the pivot pin or arbor 66 in the direction of arrow H and against the force of the spring 69. With the pivotal movement of the bearing 61, the sliding rod 48 rotates in the direction of arrow H. The upper part of the sliding rod 48 moves out of the recess 49 of the bottom plate 40*a*. This movement releases the sliding rod 48 from its engagement with the actuating plate 58. Then, the sliding rod 48 slides in the direction of arrow I under the urging of the force of the spring 62.

The sliding shaft 74 is urged by the spring 75 in the direction of arrow E', which is reverse to the direction of arrow E shown in FIG. 5. When the rotating plate 70 is released from engagement with the lower end of the sliding rod 48, the sliding shaft 74 slides in the direction of arrow E' responsive to the force of the spring 75. Then the rotating plate 70 is rotated in a pivotal motion in the direction of arrow C', which is reverse to the direction shown by arrow C. The rotating movement of the rotating plate 70 causes the sliding rod 48 to slide further in the direction of arrow C. By the downward movement of the sliding shaft 74 in the direction of arrow E', the reel disc 57 moves downwardly. The reel shaft 42 and the fixing pins 43 move out of the cartridge 10. Accordingly, the reel in the cartridge 10 is released from engagement with the reel shaft 42 and the fixing pins 43, and the cartridge is released to become removable from the chassis. However, the cartridge 10 is still held in a locked position by the roller 85.

As the lever 81 further moves on in a sliding motion in the direction of arrow G, the upstanding pin 90 on the lever 81 pushes the lever portion 87*b* of the lever 87. The lever 87 is rotated in the direction of arrow J in FIG. 2. The lever portion 87*a* is also rotated in the same direction. The pin 89 pushes the leaf spring 83 from the inside thereof and causes the leaf spring 83 to be deflected in the direction of arrow K. The roller 85 moves out of the recess 91 of the cartridge 10 and the cartridge 10 is released from a locked position.

When the cartridge 10 is released from locking by the roller 85, the arm 50 rotates in the direction of arrow L. Arm 50 is subject to a rotating force in the direction of arrow L in FIG. 2 responsive to the energized spring 52. The pin 44, mounted on the arm 50, pushes the forward end of the cartridge 10. The pin 44 again fits into the recess 45 formed on the bottom plate 40*a* and pushes the cartridge 10 out of the chassis 11 through the opening 60 by a distance which is equal to the stroke of the pin 44. At this time, the reel shaft 42 and the fixing pins 43 have already moved downwardly and out of engagement with the cartridge 10, as hereinabove described. Thus, the pushing out of the cartridge 10 is not obstructed by the reel shaft 42 and the fixing pins 43. After finishing the sliding movement described above, the sliding lever 81 slides in a direction which is reverse to the direction of arrow G and returns to its original position.

As described hereinabove, in removing the cartridge 10, the reel shaft 42 and the fixing pins 43 first move downwardly with the reel disc 57. The reel shaft 42 and the fixing pins 43 come out of engagement with the cartridge 10. Then, at a proper interval of time, the cartridge 10 is released from its locking position by the roller 85. Accordingly, the reel shaft 42 and the fixing pins 43 can be smoothly moved out of the cartridge 10. The cartridge 10 can be smoothly removed and taken out from the chassis 11 without damaging the reel shaft 42, the fixing pins 43, or the reel of the cartridge 10.

The cartridge 10, thus pushed out by some distance in the manner described above, is further taken out of the chassis 11 by hand. The actuating plate 58 moves upwardly in a pivotal motion responsive to the tension of the spring 59. At the same time, the sliding rod 48 rotates in a direction which is reverse to the direction of arrow H to an erect position under the influence of the tension of the spring 69. The upper portion of the sliding rod 48 is brought into engagement with the lower surface of the actuating plate 58, again through the recess 49 of the bottom plate 40*a*.

Accordingly, the actuating plate 58 and the sliding rod 48 return to the positions shown in FIG. 3. The pin 46 returns to its position in the recess 47 responsive to the force of the spring 56. The bent end portion 54*a* of the arm 54 restrainingly engages the upper surface of the reel disc 57 again. Thus, all the members have now returned to the original state, before the insertion of the cartridge shown in FIGS. 2 and 3.

In the specification and the appended claims the tape contained in the cartridge includes, not only a magnetic tape, but also such tapelike materials as a tape leader and a film. Further, the invention is not limited to the embodiment as hereinabove described, but many modifications and variations may be made. Therefore, the appended claims are to include all equivalents falling within the spirit and scope of the invention.

What I claim is:

1. A tape cartridge loading device comprising a tape cartridge containing a built-in reel having a tape wound thereon, a chassis in which said cartridge is inserted and loaded, drive means comprising a reel shaft capable of moving upwardly and fitting into said cartridge, energizing means for exerting a force on said reel shaft to cause said reel shaft to slide upwardly, restraining means for engaging and preventing said reel shaft from moving upwardly under the force exerted by said energizing means, thereby holding said reel shaft at its lowermost position, and means actuated responsive to the complete insertion of said cartridge into said chassis to release said reel shaft restraining means, said energizing means storing a force responsive to the insertion of said cartridge into said chassis, and said reel shaft moving upwardly into said chassis responsive to releasing of said reel shaft from engagement with said restraining means, thereby enabling said reel shaft to move into said cartridge only after it has been completely loaded in said chassis.

2. The device of claim 1 which further comprises means for releasing said energizing means from exerting a force on said reel shaft, and means for actuating said releasing means when said cartridge is removed from said chassis, said reel shaft moving downwardly and out of engagement with said cartridge and said chassis responsive to the releasing of said energizing means by said releasing means.

3. The device of claim 2 further comprises cartridge locking means for locking said cartridge after it has been completely inserted into said chassis, releasing means for releasing said cartridge from said cartridge locking means, and means for operating said releasing means in a delayed motion subsequent to an operation of said means for releasing said energizing means.

4. The device of claim 1 in which said energizing means comprises a sliding member, means for sliding said member downwardly as said cartridge is inserted into said chassis, a rotating member having one end engaged by said sliding member for simultaneously rotating and moving said sliding member downwardly, and a resilient member energized by the downward movement of said rotating member, said pivoting member having another end engaging the lower end of a sliding shaft which mounts said reel shaft on the upper end thereof.

5. The device of claim 4 which further comprises releasing means for releasing said sliding member from a rotating force exerted on the rotating member, and actuating means for actuating said releasing member responsive to a removing of said cartridge from said chassis, said removal releasing said rotating member from engagement at one end thereof with said releasing member, thereby releasing said resilient member from the energizing force.

6. The device of claim 5 in which said actuating means comprises an operating button and a sliding lever moving in a sliding motion responsive to an operation of said operating button, said sliding lever causing said sliding member to rotate by its sliding movement, thereby releasing said rotating member from the rotating force exerted by said sliding member.

7. The device of claim 3 which further comprises means including a sliding lever for moving in a sliding motion when said cartridge is removed from said chassis, a first engaging member on said lever which engages said releasing means for releasing said energizing means from exerting a force when said lever slides, and a second engaging member provided on said lever which engages said cartridge locking means when said lever slides thereby releasing said cartridge from a locked position, said second engaging member being disposed at a position on said lever which engages said cartridge locking means after said first engaging member engages said releasing means for releasing said energizing means.

8. The device of claim 1 which further comprises a chassis base supporting said chassis, said chassis being inclined with respect to said chassis base and said reel shaft being vertically slidable with respect to the bottom surface of said cartridge inserted in said chassis.

9. The device of claim 3 which further comprises energizing means which stores a force responsive to an insertion of said cartridge into said chassis, and said energizing means urging said cartridge in a direction to push it out of said chassis, said cartridge being pushed out of said chassis by said energizing means upon releasing thereof from said cartridge locking means.

* * * * *